(12) United States Patent
Catt et al.

(10) Patent No.: US 9,359,785 B2
(45) Date of Patent: Jun. 7, 2016

(54) METAL POST REINFORCEMENT ARRANGEMENT AND A METHOD OF REPAIRING AND/OR REINFORCING DAMAGED METAL POSTS

(75) Inventors: Nigel M Catt, Adelaide (AU); Brian O'Malley, Adelaide (AU)

(73) Assignee: Ocvitti Pty Ltd (AU)

( * ) Notice: Subject to any disclaimer, the term of this patent is extended or adjusted under 35 U.S.C. 154(b) by 0 days.

(21) Appl. No.: 14/344,461

(22) PCT Filed: Sep. 11, 2012

(86) PCT No.: PCT/AU2012/001086
§ 371 (c)(1),
(2), (4) Date: Nov. 26, 2014

(87) PCT Pub. No.: WO2013/036989
PCT Pub. Date: Mar. 21, 2013

(65) Prior Publication Data
US 2015/0082742 A1 Mar. 26, 2015

(30) Foreign Application Priority Data
Sep. 14, 2011 (AU) ................................ 2011903767

(51) Int. Cl.
*E04H 12/22* (2006.01)
*E02D 5/60* (2006.01)
(Continued)

(52) U.S. Cl.
CPC ............ *E04H 12/2292* (2013.01); *A01G 17/14* (2013.01); *E01F 15/141* (2013.01); *E04H 17/20* (2013.01); *E02D 5/64* (2013.01); *F16B 2/12* (2013.01); *F16B 7/0426* (2013.01)

(58) Field of Classification Search
CPC ........... E02D 27/42; E02D 5/226; E02D 5/26; E02D 5/64; E04C 3/125; E04H 12/2292; E04H 12/2269; E04H 12/2238; E04H 12/2246; E04H 12/2353; E04H 12/2261; E04H 12/22

USPC ............. 52/834, 835, 298, 169.13, 297, 170, 52/514; 256/65.04–65.06
See application file for complete search history.

(56) References Cited

U.S. PATENT DOCUMENTS 395,866 A * 1/1889 Anderson ........................ 52/517
731,752 A * 6/1903 Oadwell ......................... 52/835
(Continued)

FOREIGN PATENT DOCUMENTS

| GB | 573229 | 11/1945 |
|---|---|---|
| WO | WO 2006/085185 A1 | 8/2006 |
| WO | WO 2011/011834 A1 | 2/2011 |

*Primary Examiner* — Joshua J Michener
*Assistant Examiner* — Kyle Walraed-Sullivan
(74) *Attorney, Agent, or Firm* — Renner Kenner Greive Bobak Taylor & Weber

(57) ABSTRACT

A metal post reinforcement arrangement adapted to be clamped about a broken section of a metal post, including two opposing brackets wherein when a bolt fixes one bracket to the other about the metal post the bolt divides the broken section into upper and lower portions so as to provide support and/or structural integrity when the reinforcement arrangement is clamped about the broken section and wherein each bracket has a substantially semi circular cross-sectional configuration along said bracket length that includes a longitudinal central segment terminating on opposed sides with internally directed curved edges with corresponding upwardly extended rounded shoulders that provide substantially triangular dimples on the internal side of the bracket, and wherein a peripheral flange stems out from a rounded dip from each substantially triangular dimple such that said brackets are adapted to be fixed around metal posts having different shapes.

9 Claims, 7 Drawing Sheets

(51) Int. Cl.
*A01G 17/14* (2006.01)
*E04H 17/20* (2006.01)
*E01F 15/14* (2006.01)
*E02D 5/64* (2006.01)
*F16B 2/12* (2006.01)
*F16B 7/04* (2006.01)

(56) References Cited

U.S. PATENT DOCUMENTS

| | | | |
|---|---|---|---|
| 907,817 A * | 12/1908 | Knoerzer | 52/153 |
| 1,244,119 A * | 10/1917 | Adams | 52/835 |
| 1,489,322 A * | 4/1924 | Hogan | 52/835 |
| 1,593,330 A * | 7/1926 | De La Mare | 52/741.14 |
| 1,596,657 A * | 8/1926 | Heber | 52/168 |
| 1,665,995 A * | 4/1928 | Wiley | 52/170 |
| 1,710,842 A * | 4/1929 | Salustri | 403/312 |
| 1,755,461 A * | 4/1930 | Spring | 52/170 |
| 1,784,770 A * | 12/1930 | Wiley | 52/170 |
| 1,999,098 A * | 4/1935 | Hillyer et al. | 52/98 |
| 2,707,034 A * | 4/1955 | Hetrick | 52/835 |
| 2,897,553 A * | 8/1959 | Gorrow | 52/835 |
| 3,173,661 A * | 3/1965 | Kruger | 256/47 |
| 3,362,124 A * | 1/1968 | Du Val Cravens et al. | 52/514 |
| 3,738,072 A * | 6/1973 | Adrian | 52/170 |
| 3,950,912 A * | 4/1976 | Lundberg et al. | 52/846 |
| 4,092,079 A * | 5/1978 | Swanson | 403/306 |
| 4,258,523 A * | 3/1981 | Waugh | 47/47 |
| 4,516,365 A * | 5/1985 | Chapman | 52/170 |
| 4,543,757 A * | 10/1985 | Cosgrove | 52/295 |
| 4,756,130 A * | 7/1988 | Burtelson | 52/170 |
| 4,881,355 A * | 11/1989 | Bosl et al. | 52/506.07 |
| 5,060,416 A * | 10/1991 | Rohde | 47/32.6 |
| 5,133,164 A * | 7/1992 | Legler | 52/165 |
| 5,345,732 A * | 9/1994 | Knight et al. | 52/170 |
| 5,409,196 A | 4/1995 | Specht | |
| 5,553,433 A * | 9/1996 | Lang | 52/483.1 |
| 6,079,165 A * | 6/2000 | Bingel et al. | 52/170 |
| 6,151,860 A * | 11/2000 | Reisdorff | 52/651.02 |
| 6,453,636 B1 * | 9/2002 | Ritz | 52/835 |
| 6,755,005 B2 * | 6/2004 | Czachor et al. | 52/831 |
| D521,656 S * | 5/2006 | Terrels | D25/122 |
| 8,628,275 B1 * | 1/2014 | Trader et al. | 405/216 |
| 2005/0210821 A1 * | 9/2005 | Bingel et al. | 52/738.1 |
| 2005/0211454 A1 * | 9/2005 | Bingel et al. | 174/45 R |
| 2009/0266026 A1 * | 10/2009 | Hannay et al. | 52/745.17 |
| 2012/0011804 A1 * | 1/2012 | Winterhalter et al. | 52/834 |

* cited by examiner

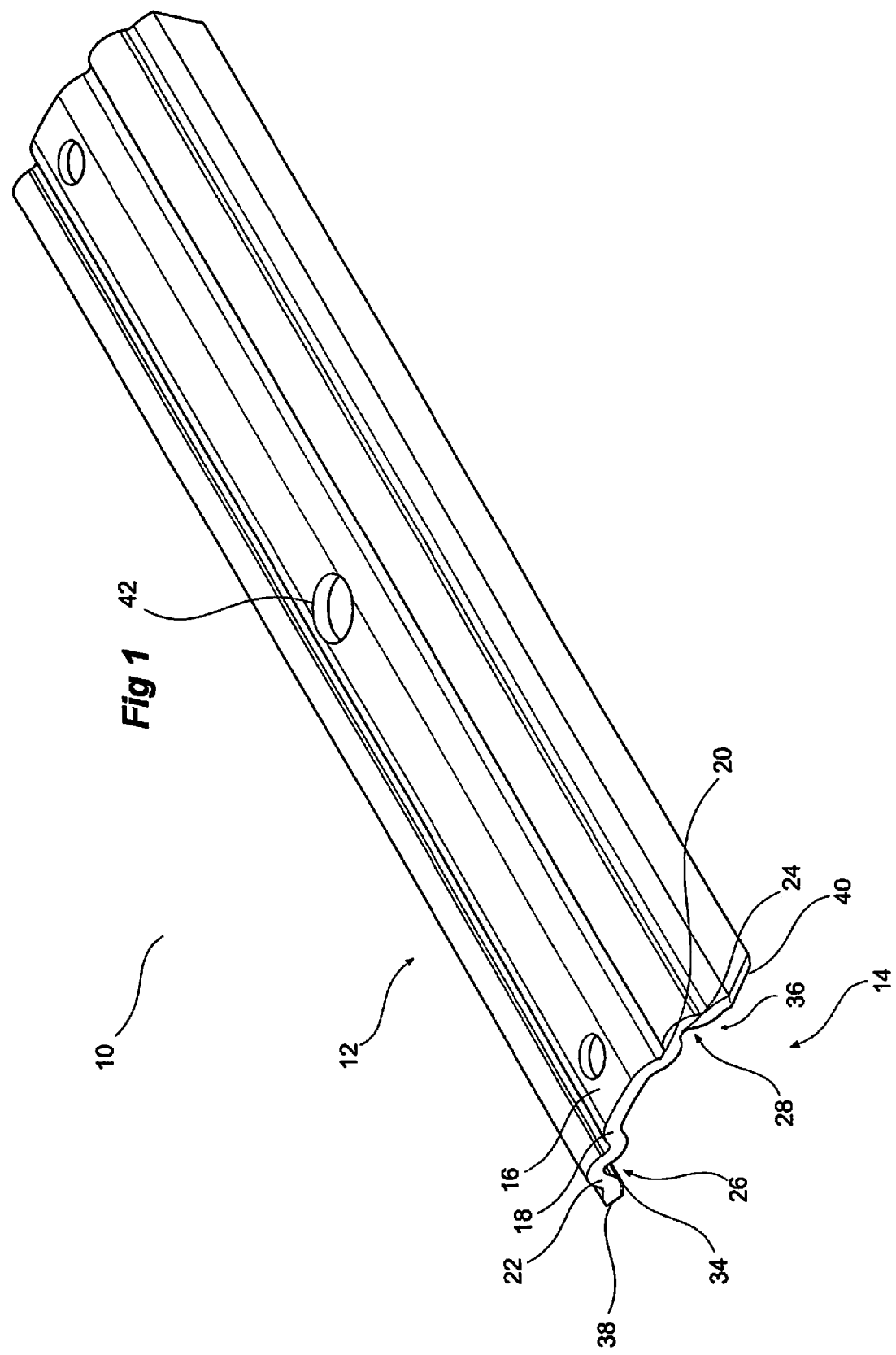

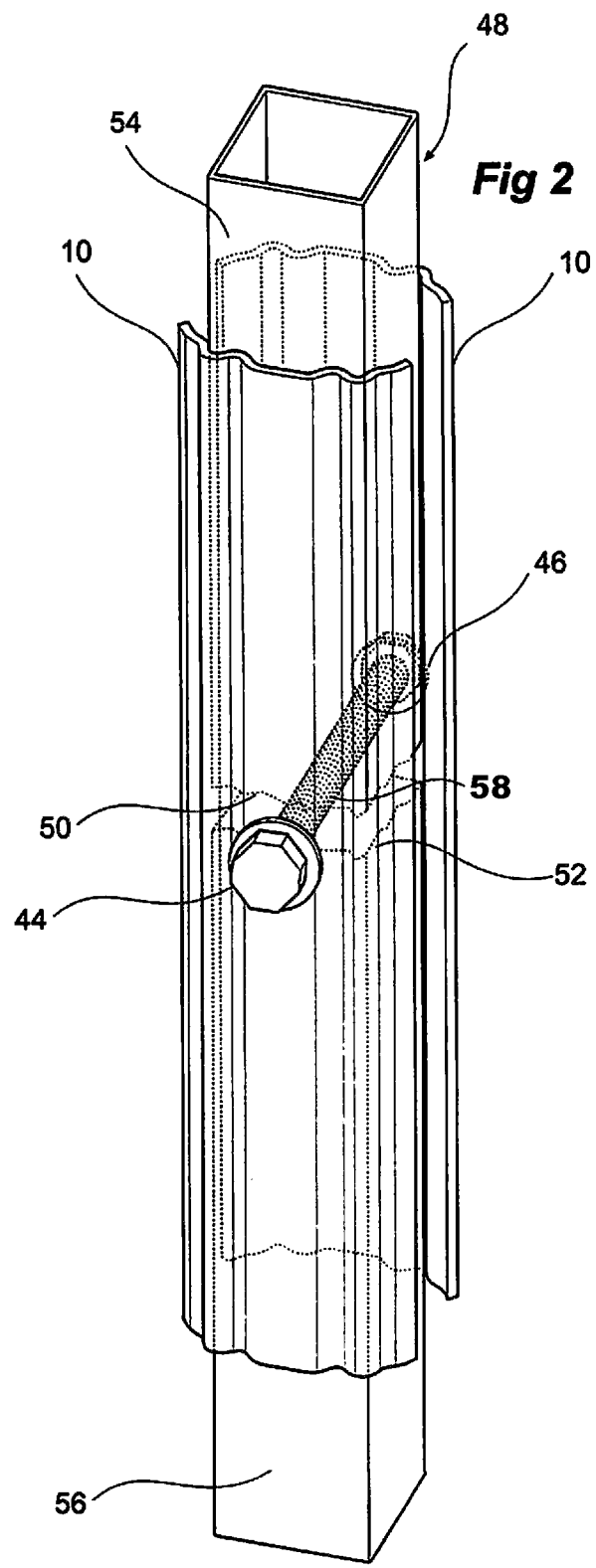

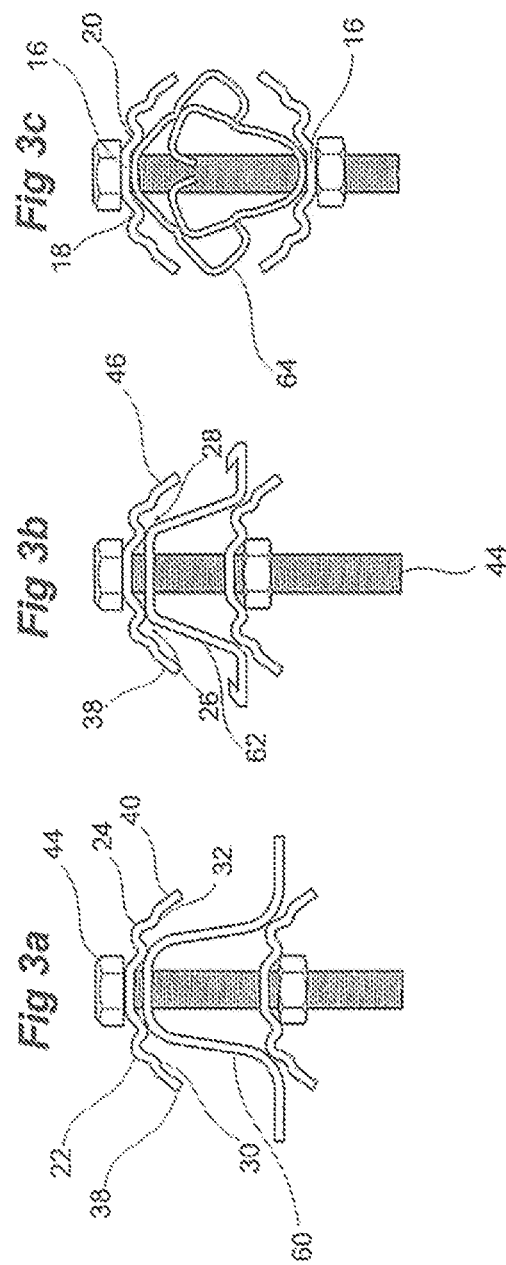

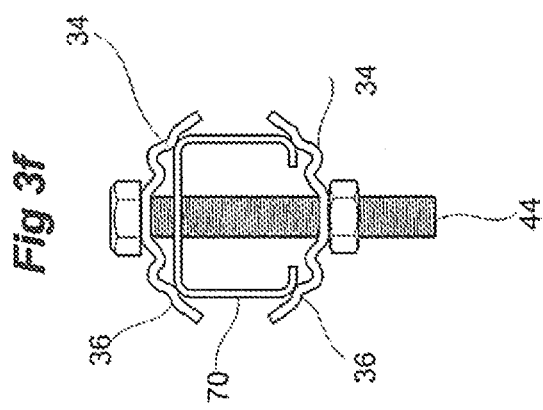
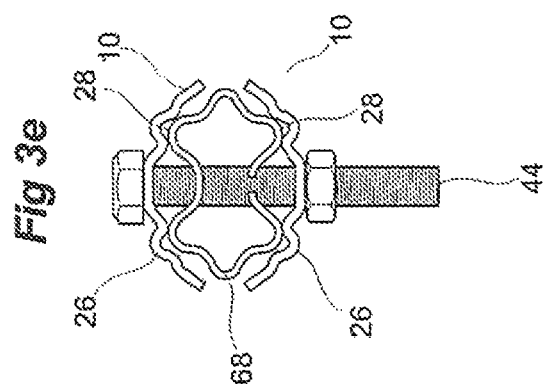
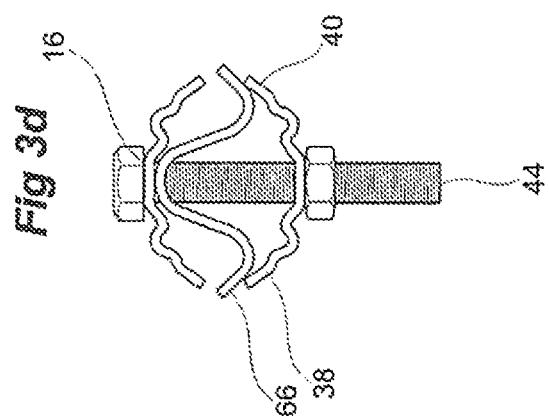

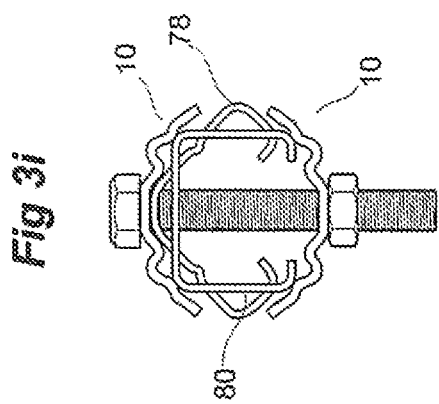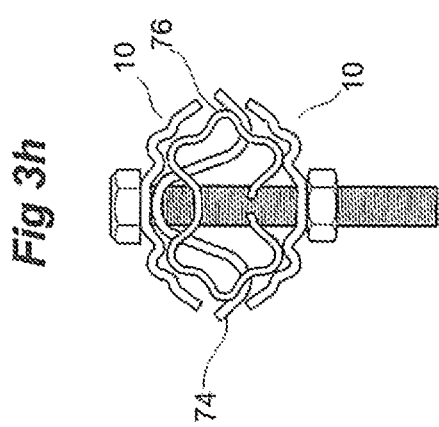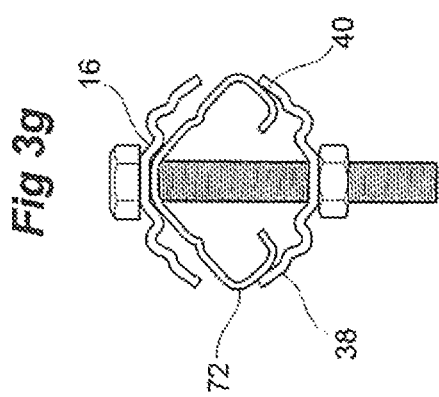

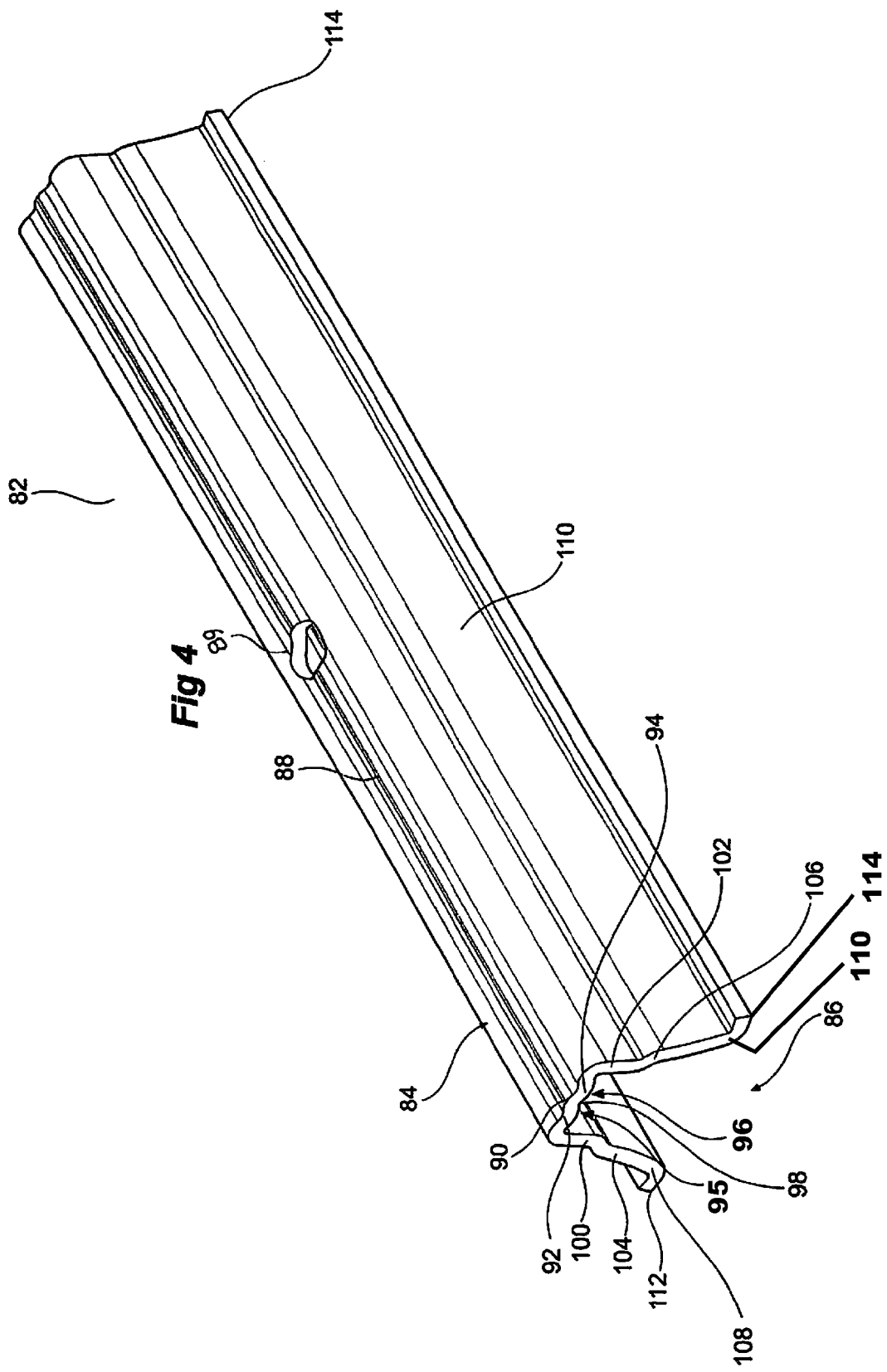

METAL POST REINFORCEMENT ARRANGEMENT AND A METHOD OF REPAIRING AND/OR REINFORCING DAMAGED METAL POSTS

FIELD OF THE INVENTION

This invention relates generally to reinforcement and/or repair of damaged metal posts, the kinds of posts one associates with supporting lengths of wiring or sections of nets often between more substantial upright support posts for a fencing and/or vineyard trellis arrangement.

There is nothing in this document to suggest that the arrangement can also not apply more generally to domestic fencing and so forth, hence the document should not be read restrictively.

While for the most part this specification describes the repair and reinforcement of metal posts associated with a trellis system used in vineyards, orchards and other similar agriculture and horticulture enterprises, the arrangement and method of repair is equally applicable to metal posts that are utilised in more general fencing structures, for example the kinds associated with animal containment fencing across broad acreage, with the use against deer, rabbits and kangaroos and so forth.

BACKGROUND DISCUSSION

Metal posts by their very nature lack an inherent flexible resiliency. They tend to be brittle and if bendable, such folds ultimately create a point of weakness which upon further stress can lead to breakage of such metal posts.

As one of the main functions of an upright metal support post is to hold in place a fencing and/or trellis construction the action of wind against the post can instigate metal fatigue as the sunken post is blown and vibrated back and forth. As the metal post has no ability to inherently flex when the wind is forced against it, this ultimately leads to fractures and fissures which can see the metal snap in half.

Still further, as introduced above, metal posts are often incorporated in trellis systems located in between more substantial vertical supports.

In any event these posts are still linked by laterally extending trellis wires which are extended down each row and anchored under tension to the end post.

Mechanical harvesting of modern vineyards mandates that in many instances the harvester must impart a shaking action on the trellis. Such shaking, while designed to dislodge the grapes from the vine, also places considerable force on these metal posts and also along the trellis wire which translates into a push and pull effect upon the metal posts which ultimately may break, split or crack one or more of the metal posts along the length of the row.

Metal posts, again by their inherent characteristics are subjected to chemical corrosion wherein dissolved agricultural chemicals and so forth into the soil interact through electrolysis leading to a degradation of the metal, again which when stress is placed upon the metal posts means that these places where chemical corrosion has taken place will be weakened and are more likely to be broken in half.

Still even further, as metal posts often support fencing arrangements and vineyard trellis systems in places that are regularly exposed to agricultural chemical sprays and so forth, these chemicals react with the metal posts and remove the galvanizing, leading to a breakdown in the structure of the metal post, exposing weaknesses which upon further stresses will see the metal post being broken and thereby of little use.

It is even documented that many metal posts that are located close to sea water often have accelerated degradation as salt can either be blown onto the posts to etch away at the metal structure or alternatively salt is incorporated into, precipitation such as dew, fog and rain which is then wetted down on to the metal post where the salt in the water commences an aggressive corrosive attack upon the metal posts destroying their support integrity.

As the person skilled in the art will appreciate that even if a bent post is pulled or pushed back into shape, the fold line becomes a point of weakness and subsequent stress upon that fold will see the metal post easily broken in two.

As the above introduces, while metal posts are a convenient way in which to support fencing and trellis systems, they are exposed to a variety of hazards which prey upon their inherent ability to offer useful support withinside the fence or trellis structure.

Still further, the very nature of fencing and trellis systems referred to above, is that they can be extremely long and densely populated which means that over time the actual metal posts used withinside the arrangement could differ from those posts sunken at earlier times.

Therefore when one is to repair such large expansive areas of fencing and/or trellis systems, the repair and reinforcement of such metal posts would require a solution that could accommodate all different types of configured metal posts which are used in these systems.

It would be not at all useful or convenient to be able to come up with a solution of repairing and/or reinforcing just the one type of metal post that one in the trade would come across during the process of working ones way through the fencing and/or trellis system to make the necessary maintenance and repair as required.

It is therefore an object of this invention to provide a metal post reinforcement arrangement that can overcome the problems referred to above or at least substantially ameliorate them.

Further objects and advantages of the invention will become apparent from a complete reading of this specification.

SUMMARY OF THE INVENTION

Accordingly in one form of the invention there is provided a metal post reinforcement arrangement adapted to be clamped about a broken section of a metal post, said arrangement including:

two opposing brackets each including a recess for a bolt to pass there through to fix one bracket to the other bracket so that said brackets when fixed by the bolt provide a tight fit about the broken section of said metal post;

wherein when said bolt fixes one bracket to the other about the metal post the bolt is adapted to pass through the broken section of the metal post to divide the broken section into upper and lower portions so as to provide support and/or structural integrity to said upper and lower portions when the reinforcement arrangement is clamped about the broken section of the metal post; and further wherein each bracket has a substantially semi circular cross-sectional configuration along said bracket length that includes a longitudinal central segment terminating on opposed sides with internally directed curved edges with corresponding upwardly extended rounded shoulders extended there from said curved edges, with each rounded shoulder providing a substantially triangular dimple on an internal side of the bracket to the rounded shoulder, and wherein a peripheral flange stems out from rounded dip from each substantially triangular dimple such that said brackets are adapted to be fixed around metal posts having different shapes.

An advantage of such an arrangement is that for the first time damaged metal posts which have been split in two can be conveniently repaired in situ by bringing together the two opposing brackets but as these two opposing brackets also include the central fastening bolt which once fastened by bringing two opposing brackets and by the fact that each broken portion of the metal post will be clamped and fitted on either side of the fastening bolt improving upon the resilient strength of the repaired metal post.

Advantageously the ability to rest the respective upper and/or lower portions that have been split in two of the metal post under repair, means that when the brackets are being fixed about the broken section, these two said portions can be conveniently brought together to rest in place about the central bolt and then have the bolt fastened in place and as this is completed one bracket can be brought closer to the other.

Hence not only does the use of a central fastening bolt provide a general means in which to support two split apart portions of a damaged post, it also provides the clamping mechanism as well as additional support once the upper or lower portions rests or abut up against the fastening bolt bringing the two brackets together.

In preference the bracket recess for the bolt to pass there through to fix one bracket to the other bracket so that said brackets when fixed by the bolt provide a tight fit about the broken section of said metal post is centrally located on each bracket.

As discussed above, one major problem with fencing and trellis systems is that they can be extremely long and densely populated which means that over time the actual metal posts used in the overall arrangement could differ from the posts sunken at earlier times. Therefore with metal posts having different shapes it means it would be appropriate to come up with a bracket which is more likely to accommodate posts of different shapes especially if one is to get a tight fit about the broken section of the post.

For example, while a pure semi-circular type cross-sectional longitudinal configuration of a bracket may work with a circular metal post, such a restrictive shape configuration for a bracket may not work or be adapted to appropriately clamp a reinforcement arrangement around metal posts that have a C shape, square shape, ram shape, bulls head shape and so forth.

Advantageously, with the invention provided herewith the unique configuration of having the brackets including as part of their semi-circular cross-sectional configuration with the inclusion of the longitudinal central segment which terminates on each side with internally directed curve edges, along with the introduction of the upwardly extended rounded shoulders which then on the internal side provide for substantially triangular dimples and then also the unique dip that extends out from the triangular dimples and the peripheral flange that stems out from the dips, all offer unique anchoring features so that metal posts of different shapes can still utilise the same single bracket.

In preference the upwardly extended rounded shoulders are provided on an external face of said bracket.

In preference the substantially triangular dimples and the dips are provided on an internal face of said bracket.

In preference one bracket is fixed to the other bracket such that each brackets internal side when fixed about a broken section of the metal pipe would face the internal side of the bracket fixed on the other side of the metal post.

Advantageously in these kinds of embodiments metal posts of different shapes will be able to utilise the unique features on the internal side of the bracket including the central segment, the internally directed curved edges coming out from the longitudinal central segment, the substantially triangular dimples on each side of the longitudinal central segment, the rounded dips stemming from the substantially triangular dimples as well as the use of the peripheral flanges.

In preference in a further embodiment when the bolt fixes one bracket to the other about the metal post wherein the bolt is adapted to pass through the broken section of the metal post to divide the broken section into upper and lower portions so as to provide support and structural integrity to said upper and lower portions when the reinforcement arrangement is clamped about the broken section of the metal post, the brackets are fixed one to the other about the metal post such that the internal face of one bracket faces an external face of the opposing bracket on the other side of the metal post.

Advantageously in this embodiment one of the brackets essentially is inverted so that the features such as the upwardly extended rounded shoulders can be utilised to assist in providing an anchoring feature or point to better assist in the tight clamping fix of the two brackets about the broken section of the metal post.

Advantageously the unique cross-sectional longitudinal configuration of the bracket allows for the brackets to be arranged one to the other not always as one would expect in a mirrored arrangement, the brackets can also be inverted one to the other if required so as to use the features unique to the external and/or internal sides of the bracket to provide greater options in order to accommodate metal posts of different shapes.

Regardless of the metal post under repair, this single bracket can be utilised for its versatility of overall design to be not only able to be clamped up against the broken portions of the metal post when mirror images are brought face to face, they can also be inverted where one virtually nests or rests within the configuration of the other only separated by the portions of the metal posts which they are clamping together in a repairable support structure.

In an alternative embodiment of the invention the apparatus further includes the use of one or both of the opposing brackets described above but also introduces an additional configuration of one of the opposing brackets wherein the bracket takes on a more substantial U shape configuration.

An advantage of such an arrangement is that in some instances, particularly in the United States where they use what is referred to as a T metal post the use of the U shape as one of the opposing brackets will allow both the substantially curved bracket and the U shape bracket to come together and accommodate the T shape metal post and in an effective clamping arrangement.

Accordingly in a further form of the invention there is provided a metal post reinforcement arrangement adapted to be clamped about a broken section of a metal post, said arrangement including:
 a first and second opposing brackets each including a recess for a bolt to pass there through to fix one bracket to the other bracket so that said brackets when fixed by the bolt provide a tight fit about the broken section of said metal post;
 wherein when said bolt fixes the first bracket to the second bracket about the metal post the bolt is adapted to pass through the broken section of the metal post to divide the broken section into upper and lower portions so as to provide support and/or structural integrity to said upper and lower portions when the reinforcement arrangement is clamped about the broken section of the metal post; and wherein said first bracket has a substantially semi circular cross-sectional configuration along said bracket length that includes a longitudinal central segment terminating on opposed sides with internally directed curved edges with corresponding upwardly extended rounded shoulders extended there from said curved edges, with each rounded shoulder providing a substantially triangular dimple on an internal side of the bracket to the rounded shoulder, and wherein a peripheral flange stems out from rounded dip from each substantially triangular dimple; and wherein the second bracket has a substantially U shaped longitudinal cross-sectional configuration.

In preference the substantially U shaped longitudinal cross-sectional configuration of the second bracket includes a central base platform which provide on an external side of said second bracket having a raised ridge along the central base platform flanked by two valleys, said ridge providing a corresponding valley on an internal side of said second bracket and said flanked valleys providing corresponding mounds on the internal side of said second bracket.

In preference the substantially U shaped longitudinal cross-sectional configuration further includes rounded shoulders with diverging arms extending from opposing sides of said central base platform wherein the diverging arms terminate in an outwardly extending fold extending out into longitudinal side flanks wherein said longitudinal side flanks terminate with a substantially laterally extending skirt.

An advantage of such an arrangement is that the second bracket can now work in conjunction with the substantially semi-circular cross-sectional configuration referred to above to provide further combinations that can utilise the various ridges, valleys, mounds, folds, flanks and skirting on both the external and internal sides of the second bracket to work with those features of the first semi-circular cross-sectional configuration bracket so that again metal posts of different shapes will still be able to be repaired as these brackets can be orientated so that when one bracket is fixed to another bracket so those features inherently included as part of the first and second brackets can be utilised to fix the metal post in place.

In preference when the bolt fixes the first bracket to the second bracket the internal faces of each of the respective first and second bracket face each other on opposing sides of the broken section of the metal post where the reinforcement arrangement is clamped to that broken section of the metal post.

In preference the internal face of the first bracket when fixed to the second bracket about the broken section of the metal post faces the external face of the second bracket.

In preference the brackets are made or metal and/or reinforced plastic.

In preference each bracket includes a series of ribs, grooves and/or ridges along the length of the bracket to provide additional rigidity.

Preferred embodiments are now presented with the assistance of the following illustrations and accompanying text.

BRIEF DESCRIPTION OF THE DRAWINGS

FIG. 1 is a perspective view of a bracket used as part of the reinforcement arrangement in a preferred embodiment of the invention.

FIG. 2 is a perspective view showing the bracket of FIG. 1 being fixed to another bracket of the same configuration about a broken section of a metal post under repair.

FIG. 3a shows what best can be described as a top down looking cross-sectional view of the bolt bringing together opposing brackets about a metal posts in a preferred embodiment of this invention.

FIG. 3b shows a top down looking cross-sectional view of the bolt bringing together opposing brackets about another metal post;

FIG. 3c shows a top down looking cross-sectional view of the bolt bringing together opposing brackets about another metal post;

FIG. 3d shows a top down looking cross-sectional view of the bolt bringing together opposing brackets about another metal post;

FIG. 3e shows a top down looking cross-sectional view of the bolt bringing together opposing brackets about another metal post;

FIG. 3f shows a top down looking cross-sectional view of the bolt bringing together opposing brackets about another metal post;

FIG. 3g shows a top down looking cross-sectional view of the bolt bringing together opposing brackets about another metal post;

FIG. 3h shows a top down looking cross-sectional view of the bolt bringing together opposing brackets about another metal post;

FIG. 3i shows a top down looking cross-sectional view of the bolt bringing together opposing brackets about another metal post;

FIG. 4 is a perspective view of a further bracket used as part of the reinforcement arrangement in a preferred embodiment of the .invention.

DETAILED DESCRIPTION OF THE ILLUSTRATIONS

Figure 5A:
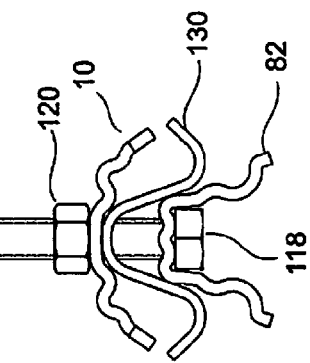
FIG. 5a illustrates on embodiment of what best could be described as a top down looking cross-sectional view showing the bracket illustrated in FIG. 4 being used In combination with a bracket or brackets illustrated in FIG. 1 when being fixed together about a metal post under repair.

Referring to the illustrations now in greater detail wherein shown in FIG. 1 is a preferred embodiment of a bracket used as part of the reinforcement arrangement shown as (10).

The bracket includes an external face (12) and an internal face (14).

The substantially semi-circular cross-sectional configuration of bracket (10) includes a longitudinal central segment (16) which terminates on opposed sides with internally directed curves edges (18) and (20).

These internally directed curves edges (18) and (20) are joined to what could best be described as upwardly extended rounded shoulders (22) and (24) if viewed from the external face (12) of the bracket (10).

These upwardly extended rounded shoulders (22) and (24) have corresponding substantially triangular dimples (26) and (28) on the internal side (14) of the bracket (10).

The substantially triangular dimples (26) and (28) are then connected to rounded dips (34) and (36) which then extend out into the peripheral flanges (38) and (40).

All these particular features of the bracket (10) presented on either the external face (12) or the internal face (14) as will be discussed in greater detail when referencing FIG. 3a through to 3i allow the bracket (10) when they are fixed about a broken section of a metal post under repair to be able to be fixed around such metal posts that have a variety of different shapes.

As introduced above one of the benefits of the bracket (10) is that it is in a sense more universally adapted to be able to clamp together with an opposing bracket in order to appropriately fix itself about the metal post regardless of the shape of the metal post under repair.

Again as will be discussed in greater detail when making reference to FIG. 3a through to 3i, in certain arrangements the bracket can be inverted so that the internal face (14) of one bracket (10) can align itself with the external face of an opposing bracket and vice versa.

By having features such as the raised rounded shoulders (22) and (24) on the external face (12) of the bracket (10) and also features such as the substantially triangular dimples (26) and (28) as well as the rounded dips (34) and (36) means that either side (12) and (14) of the bracket (10) can assist in arranging the brackets relative to the other to engage appropriately about metal posts of differing shapes in order to achieve a fixed clamp.

FIG. 2 assists in illustrating the important aspect of the invention wherein when the bolt fixes the brackets (10) to the other about the metal post (48). The bolt (44) is adapted to pass through the recess (42) on the brackets (10) which in the embodiment shown in FIG. 2 has the bolt fixing the brackets together through the nut (46).

As can be seen in FIG. 2, the main stem (58) of the bolt (44) rests on the broken portion (52) of the lower portion or part of the metal post (48) with the upper part (54) of the metal post (48) then resting upon the stem (58) of the bolt (44) at the broken end (50).

Importantly the bolt (44) is playing a part in supporting and providing structural integrity to the broken portions upper and lower portions or parts (54) and (56) of the metal post (48) under repair.

Conventionally the two broken pieces of the metal post would be joined together as well as possible to then have the clamp fixed by other means in order to bring the two brackets (10) together for the reinforcement arrangement.

Uniquely in this invention however the bolt (44) which will bring the respective opposing brackets (10) together is inserted between the fractured separated upper and lower portions of the metal post.

As alluded to above, FIG. 3a through to 3i show how metal posts of different longitudinal cross-sectional shapes (60), (62), (64), (66), (68), (70) and (72) can all still be accommodated and secured within the clamped brackets (10).

In FIGS. 3a and 3b have one bracket (10) with its internal face (14) facing the external face (12) of what best could be described as an inverted bracket (10) so that the metal post (60) can be anchored and secured utilising the inherent features of the bracket (10).

In FIGS. 3c, 3d, 3e, 3f and 3g the brackets (10) are facing each other as a mirror image wherein the metal posts (64), (66), (68), (70) and (72) are fixed in position utilising the features incorporated as part of the overall substantially semi-circular cross-sectional configuration from the internal side or face (14) of the brackets (10).

FIGS. 3h and 3i introduce the versatility of the bracket (10) to still be able to clamp about metal posts that have almost two parts shown as combined cross-sectional shape representations wherein there is shown as (74) and (76) in FIG. 3h and (78) and (80) in FIG. 3i for the complete metal posts. Nonetheless, metal posts with such structure can still be incorporated and appropriately clamped as illustrated utilising the brackets (10).

FIG. 4 shows a perspective view of an additional or alternative bracket (82) that can be used within the reinforcement arrangement upon certain types of metal posts.

The bracket shown generally as (82) includes an external face (84) and an internal face or surface (86).

Overall this bracket (82) has a generally substantially U shaped longitudinal cross-sectional configuration along its length.

The central base platform (88) which runs along the length of the bracket (82) includes the central recess (89) which the fixing bolt can pass through.

This central platform (88) provides what could best be described as on its external surface a raised ridge (90) which on opposing sides includes valleys (92) and (94).

This ridge (90) and corresponding valleys (92) and (94) provide for the raised mounds (95) and (96) and dip (98) on the internal side (86) of the bracket (82).

From the base platform (88) diverging arms (100) and (102) terminate at the outward extending folds (104) and (106) then lead into the main slanted sides (108) and (110) of the bracket (82) wherein these slanted sides (108) and (110) end in the lateral skirts (112) and (114).

As illustrated in FIG. 5a through to 5e it is once again the use of these various ridges, valleys, mounds, folds, diverging arms and skirts that provide the inherent features which allow the bracket the opportunity to engage with metal posts having different structural shapes in order to clamp there about them when the post is under repair.

FIG. 5a illustrates how bracket (82) has its internal face (86) aligned with the internal face (14) of bracket (10) as it is clamped about metal post (116) and fixed in place through the bolt (118) and the accompanying bolt (120).

Figure 5B:
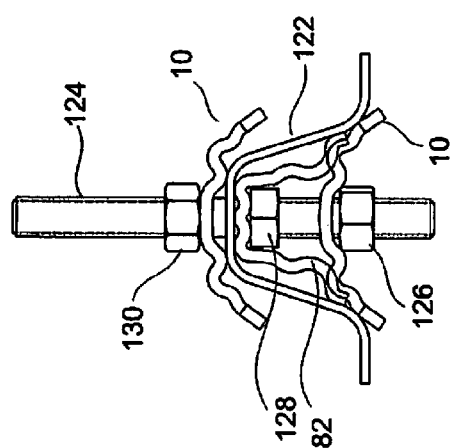
FIG. 5b illustrates another embodiment of what best could be described as a top down looking cross-sectional view showing the bracket illustrated in FIG. 4 being used In combination with a bracket or brackets illustrated in FIG. 1 when being fixed together about a metal post under repair.

FIG. 5b shows an embodiment wherein the bracket (82) is used in combination with two brackets (10) in order to secure into place the metal post (122) wherein the bolt (124) and accompanying nuts (126), (128) and (130) fix the respective brackets (10) and (82) in place about the metal post (122) under repair.

Figure 5C:
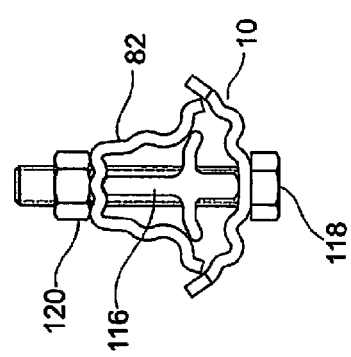
FIG. 5c illustrates another embodiment of what best could be described as a top down looking cross-sectional view showing the bracket illustrated in FIG. 4 being used In combination with a bracket or brackets illustrated in FIG. 1 when being fixed together about a metal post under repair.
Figure 5D:
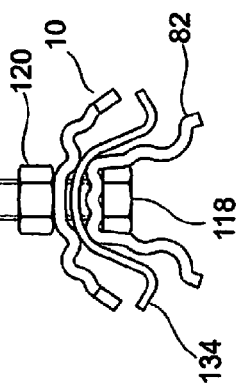
FIG. 5d illustrates another embodiment of what best could be described as a top down looking cross-sectional view showing the bracket illustrated in FIG. 4 being used In combination with a bracket or brackets illustrated in FIG. 1 when being fixed together about a metal post under repair.
Figure 5E:
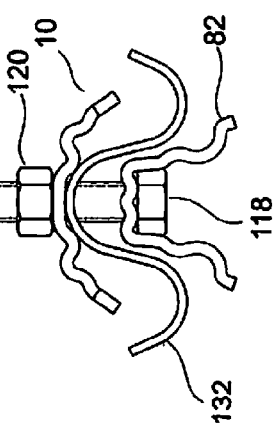
FIG. 5e illustrates another embodiment of what best could be described as a top down looking cross-sectional view showing the bracket illustrated in FIG. 4 being used In combination with a bracket or brackets illustrated in FIG. 1 when being fixed together about a metal post under repair.

FIGS. 5c, 5d and 5e illustrate how metal posts (130), (132) and (134) can be clamped against the respective brackets (10) and (82) through the use of the main bolt (118) and the fixing nut (120) utilising unique inherent features that have been included as part of a substantially semi-circular cross-sectional configuration of bracket (10) or alternatively the substantially U shaped longitudinal cross-sectional configuration of bracket (82).

The invention claimed is:

1. A metal post reinforcement arrangement comprising:
   a first metal post portion and a second metal post portion defined by a broken section of a metal post;
   a first bracket including a first recess;
   a second bracket including a second recess, said second bracket opposite said first bracket;
   a bolt passing through said broken section and through said first recess and said second recess to fix said first bracket to said second bracket and fit said first bracket and said second bracket about the broken section of said metal post;
   wherein said bolt rests on a top of said first metal post portion, and said second metal post portion rests upon said bolt such that said bolt provides support to said first metal post portion and said second metal post portion; and further
   wherein said first bracket and said second bracket each have a substantially semi circular cross-sectional configuration including a longitudinal central segment terminating on opposed sides with internally directed curved edges with corresponding upwardly extended rounded shoulders extending therefrom, with each upwardly extended rounded shoulder of said first bracket and said second bracket providing a substantially triangular dimple on an internal side, and wherein a peripheral flange stems out from a rounded dip from each substantially triangular dimple such that said first bracket and said second bracket are configured to be selectively fixed around metal posts having different shapes, with differently shaped metal posts engaging different ones of said longitudinal central segment, said internally directed curved edges, said upwardly extended rounded shoulders, said substantially triangular dimples, said peripheral flanges, and said rounded dips when said first bracket and said second bracket are fit about said metal posts having different shapes.

2. The arrangement of claim 1 wherein said first recess is centrally located on said first bracket and said second recess is centrally located on said second bracket.

3. The arrangement of claim 1 wherein the upwardly extended rounded shoulders are provided on the external faces of said first and second brackets.

4. The arrangement of claim 3 wherein the substantially triangular dimples and the rounded dips are provided on internal faces of said first bracket and said second bracket.

5. The arrangement of claim 4 wherein said first bracket is fixed to said second bracket such that said internal face of said first bracket faces said internal face of said second bracket.

6. The arrangement of claim 4 wherein said first bracket is fixed to said second bracket such that said internal face of said first bracket faces said external face of said second bracket.

7. The arrangement of claim 1 wherein said first bracket and said second bracket are made of metal and/or reinforced plastic.

8. The arrangement of claim 1 wherein each of said first bracket and said second bracket includes a series of ribs, grooves and/or ridges along the length to provide additional rigidity.

9. The arrangement of claim 1, further comprising a third bracket having a substantially U shaped longitudinal cross-sectional configuration and cooperating with said first bracket and said second bracket to be fixed around metal posts having different shapes.

* * * * *